(12) United States Patent
Tomita et al.

(10) Patent No.: US 7,522,938 B2
(45) Date of Patent: Apr. 21, 2009

(54) PORTABLE INFORMATION TERMINAL APPARATUS

(75) Inventors: Yoshihiro Tomita, Osaka (JP); Yasushi Nakagiri, Kyoto (JP); Tsuguhiro Korenaga, Osaka (JP); Kunio Hibino, Osaka (JP); Seiji Karashima, Osaka (JP); Satoru Tomekawa, Kanagawa (JP)

(73) Assignee: Panasonic Corporation, Osaka (JP)

( * ) Notice: Subject to any disclaimer, the term of this patent is extended or adjusted under 35 U.S.C. 154(b) by 673 days.

(21) Appl. No.: 11/149,291

(22) Filed: Jun. 10, 2005

(65) Prior Publication Data

US 2005/0281555 A1     Dec. 22, 2005

(30) Foreign Application Priority Data

Jun. 18, 2004    (JP)   ............................ P2004-180645

(51) Int. Cl.
*H04M 1/00*     (2006.01)
*H04M 11/00*    (2006.01)

(52) U.S. Cl. ................................ 455/550.1; 379/93.05

(58) Field of Classification Search .............. 455/550.1, 455/574; 725/62, 106; 379/93.05, 93.09, 379/272, 273; 398/115

See application file for complete search history.

(56) References Cited

U.S. PATENT DOCUMENTS

| | | | |
|---|---|---|---|
| 6,704,545 B1 * | 3/2004 | Wala | ............................ 455/16 |
| 6,965,788 B1 * | 11/2005 | Barratt et al. | ............... 455/574 |
| 2005/0053309 A1 * | 3/2005 | Szczuka et al. | ............. 382/284 |

FOREIGN PATENT DOCUMENTS

| | | | | |
|---|---|---|---|---|
| JP | 09-084100 | | 3/1997 | |
| JP | 09084100 | * | 3/1997 | .................. 455/550 |

* cited by examiner

*Primary Examiner*—George Eng
*Assistant Examiner*—Michael Faragalla
(74) *Attorney, Agent, or Firm*—McDermott Will & Emery LLP

(57) ABSTRACT

Based on information indicating the signal transmission amount between the first and second circuit blocks, a switching device switches an optical signal communication form which uses a first and second optical signal transmitting/receiving devices and an electric signal communication form which uses a first and second electric signal transmitting/receiving devices. Thereby, in a portable information terminal apparatus with a separate main body operation unit and a separate screen display unit, power consumed by the optical signal communication can be suppressed.

10 Claims, 10 Drawing Sheets

FIG.4A
FIG.4B
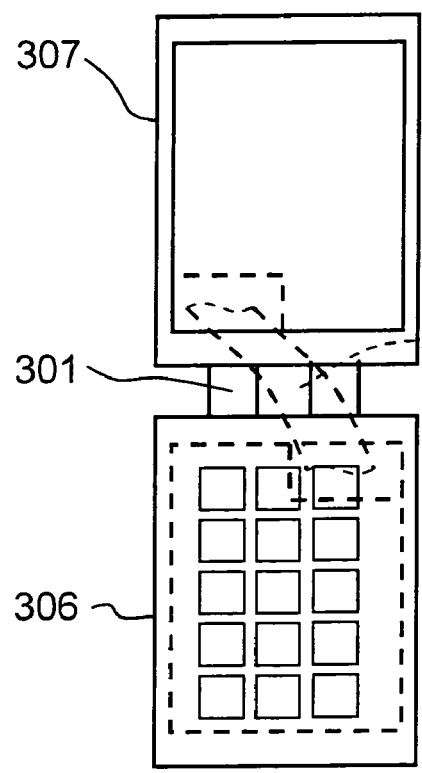
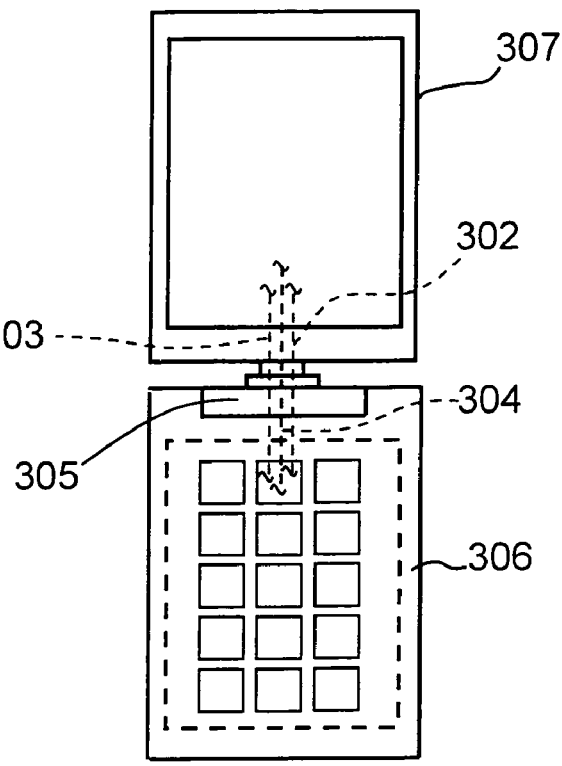

F I G. 6 A
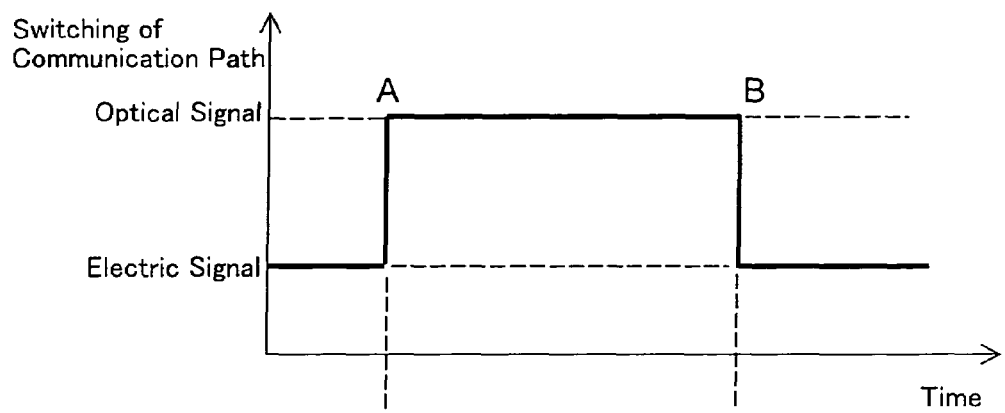
F I G. 6 B
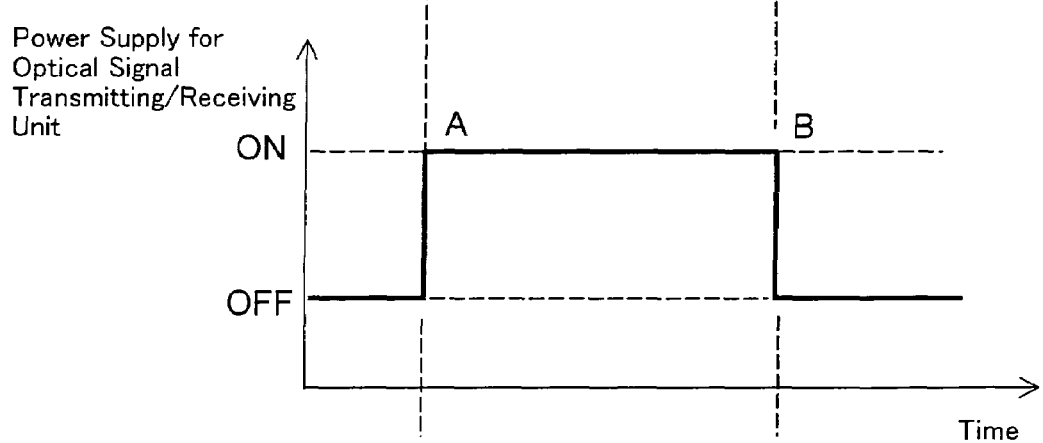
F I G. 6 C
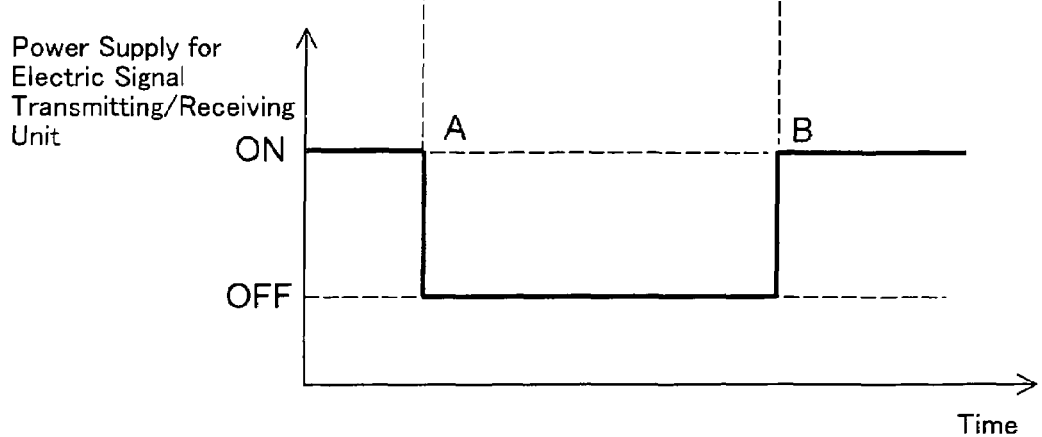

PORTABLE INFORMATION TERMINAL APPARATUS

BACKGROUND OF THE INVENTION

1. Field of the Invention

The present invention relates to a portable information terminal apparatus used as a portable telephone and the like.

2. Description of the Related Art

In the field of portable information terminal apparatus, recently, information display function has been multi-functionalized. For example, in a portable telephone, a standby screen or the like is displayed on a liquid crystal panel. Furthermore, there are portable telephones with a small camera being mounted and data picked up by the camera is stored in a built-in memory and displayed. In such structure, the amount of information for the standby screen which displays a favorite picture, etc. and the amount of image information such as the picked up data, etc. becomes extremely large compared to audio information (1,000 times larger or more). For transmitting such vast amount of information, the portable information terminal may use, as information transmitting media of the image information, optical signals which can transmit a vast amount of data at a high speed.

For example, there is proposed a portable telephone which uses optical signals for internal communication as disclosed in Japanese Patent Application (Japanese Patent Unexamined Publication No. 9-84100). FIG. 9A and FIG. 9B illustrate the structure of a conventional portable telephone. FIG. 9A is a front elevational view and FIG. 9B is a side view thereof.

In FIG. 9A and FIG. 9B, the portable telephone comprises a display operation unit 801, a platform unit 802, an RF unit 803 with an antenna 831, and a power supply unit 804. These are all separate units and each of the display operation unit 801, the RF unit 803, and the power supply unit 804 is fitted into the platform unit 802 through a fitting section a as illustrated by dash line to be connected and secured.

Further, interface units b and c, which transmits various signals between each unit, are provided between the platform unit 802 and the display operation unit 801, and between the platform unit 802 and the RF unit 803. The interface sections b and c perform communication between each block by optical couplers. For example, the interface sections b and c are formed by a combination of LED and phototransistor and are mounted to the positions opposing to each other.

FIG. 10 is a block diagram for showing the circuit structure of the conventional portable telephone. In FIG. 10, the display operation unit 801 comprises an operation input key 811, a display unit 812 such as a liquid crystal display, a control unit 913, a light transmitting unit 914 which converts a key control signal from the control unit 913 into an optical key control signal 905 and transmits it to the platform unit 802, and a light receiving unit 915 for receiving a light-state signal 906 from the platform unit 802.

The platform unit 802 comprises: a light receiving unit 923 which receives the optical key control signal 905 from the display operation unit 801 and converts it to an electric signal; a light transmitting unit 929 for sending the light-state signal 906 to the display operation unit 801; a speaker 821; a microphone 822; a light transmitting unit 924 for sending a light transmission signal 901 to the RF unit 803; a light receiving unit 925 for receiving a light receiving signal 902 from the RF unit 803; a light transmitting unit 926 for sending a light-RF-control signal 903 to the RF unit 803; a light receiving unit 927 for receiving a light-RF-state signal 904 from the RF unit 803; and a control unit 928 for controlling those units.

The RF unit 803 comprises: a hybrid 939; a radio receiving unit 932; a radio transmitting unit 933; a light receiving unit 934 for receiving the light transmission signal 901 from the platform unit 802; a light transmitting unit 935 for sending the light receiving signal 902 to the platform unit 802; a light receiving unit 936 for receiving the light-RF-control signal 903 from the platform unit 802; a light transmitting unit 937 for sending the light-RF-state signal 904 to the platform unit 802; and a control unit 938 for controlling these units. Power source 907 is supplied from a power supply unit 804 to the display operation unit 801, the platform unit 802, and the RF unit 803. The signals transmitted between the blocks are all optical signals except for the power supply.

The main object of the conventional portable telephone as shown in FIG. 9A, FIG. 9B, and FIG. 10 is to improve efficiency of manufacturing and efficiency for dealing with changes in stock and demands in terms of sales management through achieving inspections and exchanges by each unit. Each unit is connected through optical signals so that it is considered sufficient to deal with a large increase in the communication amount between the units.

However, for transmitting the same amount of signals, the optical signal communication requires a larger amount of electric power spent for converting the signals compared to the electric signal communication, since it requires photo-electrical conversion in the light transmitting units and light receiving units in each block, which causes power loss and the like. Particularly, when transmissions of signals between each block are all performed through optical signals at all times as in the case of the above-described conventional portable telephone, battery consumption is significant so that it is not suitable for long-time continuous communication.

For example, the communication information between the platform unit 802 and the display operation unit 801 is an exchange of control information for transmitting a command and status information for informing the current state. Thus, with the consideration of the extent of the communication capacity, it is not necessary to use the optical signals for the communication interface. The same is true for the control information and the status information exchanged between the platform unit 802 and the RF unit 803.

SUMMARY OF THE INVENTION

Therefore, an object of the present invention is to provide a portable information terminal apparatus which can save the power by selectively using the optical signal communication and the electric signal communication according to the extent of the capacity of the communication in use and the form to be used, and by selecting the optimum communication device between each block according to the circumstances.

In order to overcome the foregoing problems, the present invention comprises a first and second circuit blocks provided to be capable of transmitting signals between each other, and a switching device.

The first circuit block comprises: a first optical signal transmitting/receiving device which converts an electric signal into an optical signal for transmitting it to the second circuit block and also converts an optical signal received from the second circuit block into an electric signal; and a first electric signal transmitting/receiving device which transmits an electric signal to the second circuit block and also receives an electric signal from the second circuit block.

The second circuit block comprises: a second optical signal transmitting/receiving device which converts an electric signal into an optical signal for transmitting it to the first circuit block and also converts an optical signal received from the first circuit block into an electric signal; and a second electric signal transmitting/receiving device which transmits an electric signal to the first circuit block and also receives an electric signal from the first circuit block.

The switching device switches optical signal communication form by the first and second optical signal transmitting/receiving devices and electric signal communication form by the first and second electric signal transmitting/receiving devices according to signal transmission amount between the first and second circuit blocks.

It is preferable that the switching device select the optical signal communication form when the signal transmission amount is equal to or more than an upper limit which is set in advance, and select the electric signal communication form when the signal transmission amount is below the upper limit.

In the present invention, as the electric signals, a signal which is converted from a parallel signal into a serial signal may be used, for example.

It is preferable to further comprises a power supply controller which shuts power supply for the first and second electric signal transmitting/receiving devices in a state where the switching device selects the optical signal communication form, while shutting power supply for the first and second optical signal receiving/transmitting devices in a sate where the switching device selects the electric signal communication form.

In this case, it is more preferable to further comprises a power supply controller which stops power supply for the first and second optical signal transmitting/receiving devices when, under a state where the optical signal communication form is being selected, a prescribed time has passed from a point where the switching device selected the optical signal communication.

Similarly, in this case, it is still more preferable that the switching device switch communication form from optical signal communication to electric signal communication when the prescribed time has passed from a point where the optical signal communication form was selected, and the power supply controller supplies power to the first and second electric signal transmitting/receiving devices when the prescribed time has passed from a point where the switching device selected the optical signal communication form.

With the present invention, it is possible to save the power by selectively using the optical signal communication and the electric signal communication according to the capacity of the communication in use and the form to be used.

BRIEF DESCRIPTION OF THE DRAWINGS

Other objects of the present invention will become apparent as the following description proceeds upon referring to the drawings and will be defined by the appended claims. One skilled in the art will appreciate that there are many other advantages possible with the present invention, which are not mentioned in this specification.

FIG. 4A is a plan view for showing the structure of a conventional portable information terminal apparatus;

FIG. 4B is a plan view for showing the structure of the portable information terminal apparatus according to the first embodiment of the present invention;

FIGS. 6A, 6B, 6C are illustrations for showing an example of the transition state of switching operation of a communication device between a main body operation unit 100 and a screen display unit 200 in the portable information terminal apparatus of the present invention;

DETAILED DESCRIPTION OF THE INVENTION

Preferred embodiments of the present invention will be described hereinafter by referring to the accompanying drawings.

First Embodiment

Figure 1:
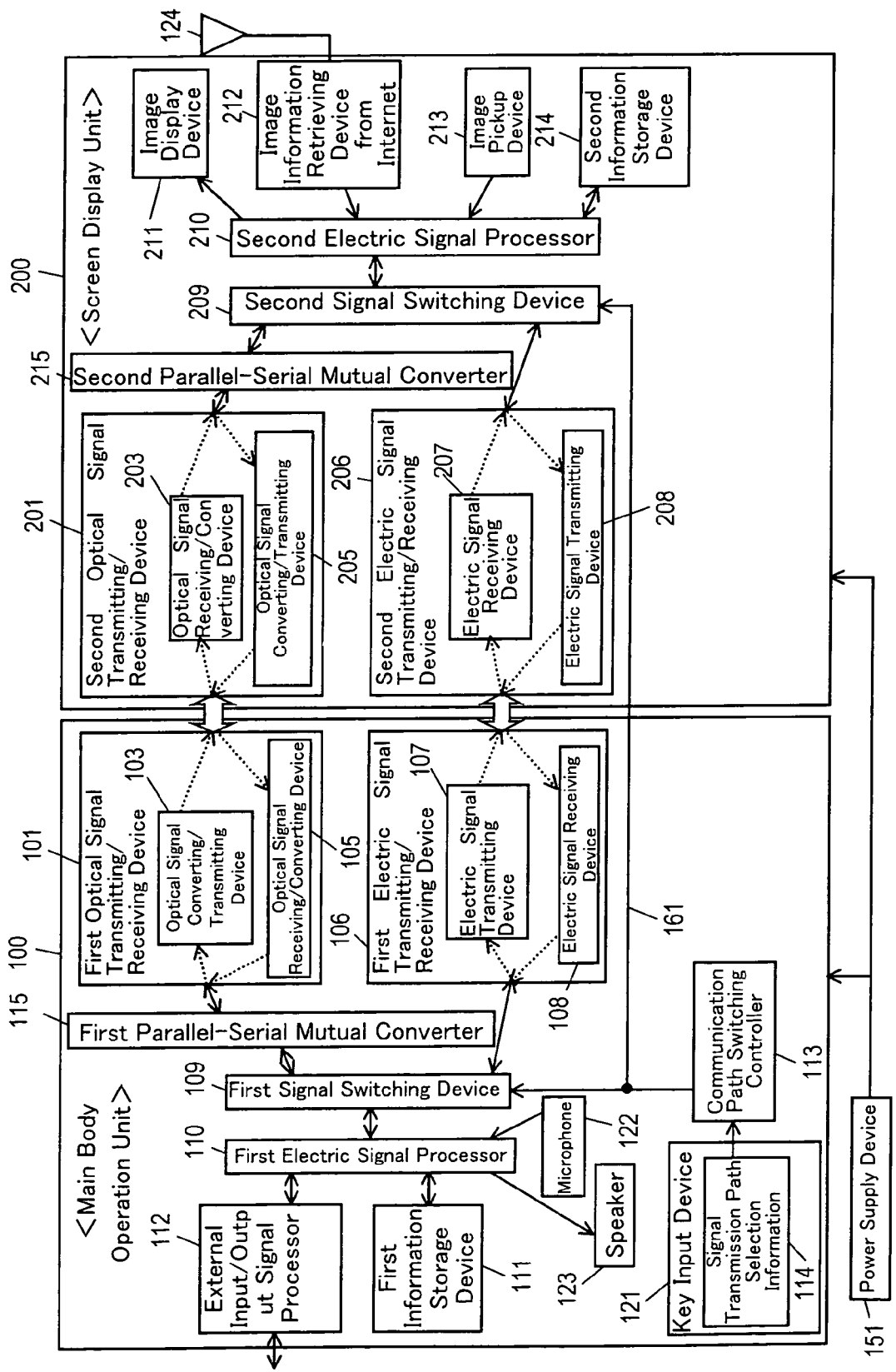
FIG. 1 is a block diagram of a portable information terminal apparatus according to a first embodiment of the present invention.

FIG. 1 is a block diagram of a portable information terminal apparatus according to a first embodiment of the present invention. The portable information terminal apparatus has such apparatus structure which can be optimally applied to a portable telephone, comprising a main body operation unit 100 as a first circuit block, a screen display unit 200 as a second circuit block, and a power supply device 151. The main body operation unit 100 and the screen display unit 200 are provided to be capable of transmitting information with each other through optical signals and electric signals.

The main body operation unit 100 comprises a first electric signal processor 110. The first electric signal processor 110 performs prescribed processing by retrieving information (for example, image information obtained by an image pickup device 213) stored in a first information storage device 111. The processing herein is the regular processing by electric signals performed by a data unit (for example, 4 bytes) regardless of the amount of information processing per unit time. The information may also be information which is obtained by an external input/output signal processor 112 from the information terminal apparatus connected to outside the main body operation unit 100. Furthermore, audio information through a microphone 122 and a speaker 123 used in a regular communication is also processed by the first electric signal processor 110.

The screen display unit 200 comprises a second electric signal processor 210. The second electric signal processor provided to the screen display unit 200 performs prescribed processing by retrieving the information stored in a second information storage device 214. The processing performed herein is also the regular processing by the electric signals. The information to be processed by the second electric signal processor 210 includes video information which is transmitted to an image display device 211 to be displayed in a monitor as a video, data information obtained by a video information retrieving device 212 on the Internet, image data information obtained by an image pickup device 213, etc.

The power supply device 151 is constituted by a charger and supplies power source to the main body operation unit 100 and the screen display unit 200.

In the portable information terminal apparatus, the main body operation unit 100 and the screen display unit 200 are physically separated. Exchange of information between both blocks is performed through electric communication or optical communication.

Normally, information transmitted between the main operation unit 100 and the screen display unit 200 is mainly audio communication information, and transmission of the information in that case is performed by the electric signal communication. The information amount of the audio communication for processing the audio information is extremely smaller than that of the image information. The signal transmission amount is below an upper limit value which is set in advance and can sufficiently be dealt with the electric signal communication. Thus, transmission of the information between the main body operation unit 100 and the screen display unit 200 in that case is performed by the electric signal communication.

The upper limit value herein means the upper limit value of the information amount which can be transmitted between the main body operation unit 100 and the screen display unit 200 by the electric signal communication without any difficulties. It is calculated in advance based on the signal processing capacities of the main body operation unit 100 and the screen display unit 200 and the transmission capacity of transmission paths (electric signal lines) which connect the main body operation unit 100 and the screen display unit 200.

A switching device performs switching to the electric signal communication. The switching device comprises a first signal switching device 109 provided to the main body operation unit 100 and a second signal switching device 209 provided to the screen display unit 200.

At the time of processing the audio information, the first signal switching device 109 performs switching for connecting the first electric signal processing device 110 and a first electric signal transmitting/receiving device 106. Also, the second signal switching device 209 performs switching for connecting the second electric signal processor 210 and a second electric signal transmitting/receiving device 206. With this, the first electric signal transmitting/receiving device 106 and the second electric signal transmitting/receiving device 206 perform mutual transmission processing of the electric signals.

In this state, the electric signals processed in the first electric signal processor 110 are transmitted to the second electric signal processor 210 through an electric signal transmitting device 107 provided to the first electric signal transmitting/receiving device 106 and an electric signal receiving device 207 provided to the second electric signal transmitting/receiving device 206.

Similarly, the electric signals processed in the second electric signal processor 210 are transmitted to the first electric signal processor 110 through an electric signal transmitting device 208 provided to the second electric signal transmitting/receiving device 206 and an electric signal receiving device 108 provided to the first electric signal transmitting/receiving device 106.

The form of transmitting information through the electric signals in the manner as described above is referred to as an electric signal communication form. Normally, the electric signal transmitting devices 107, 208 and the electric signal receiving devices 108, 207 are constituted by buffer amplifiers.

Next, described is a case of using optical signal communication. A first parallel-serial mutual converter 115 provided to the main body operation unit 100 has: a function of converting parallel electric signals (for example, 4-byte unit electric signals) outputted from the first signal switching device 109 into 1-bit unit serial electric signals; and a function of converting 1-bit unit serial electric signals which are outputted from an optical signal receiving/converting device 105 of the second optical signal transmitting/receiving device 101 into parallel electric signals (for example, 4-byte unit electric signals).

Likewise, a second parallel-serial mutual converter 215 provided to the screen display unit 200 has: a function of converting parallel electric signals (for example, 4-byte unit electric signals) outputted from the second signal switching device 209 into 1-bit unit serial electric signals; and a function of converting 1-bit unit serial electric signals which are outputted from the optical signal receiving/converting device 203 of the second optical signal transmitting/receiving device 201 into parallel electric signals (for example, 4-byte unit electric signals).

The first optical signal transmitting/receiving device 101 provided to the main body operation unit 100 has: a function of converting the information which has been converted into serial electric signal by the first parallel-serial mutual converter 115 into the optical signal from the electric signal and transmitting it to the screen display unit 200 by the optical signal converting/transmitting device 103; and a function of receiving the optical signal transmitted from the second optical signal converting/transmitting device 201 and converting it to the electric signal by the optical signal receiving/converting device 105.

Similarly, the second optical signal transmitting/receiving device 201 provided to the screen display unit 200 has: a function of converting the information which has been converted into serial electric signal by the second parallel-serial mutual converter 215 into the optical signal from the electric signal and transmitting it to the main body operation unit 100 by the optical signal converting/transmitting device 205; and a function of receiving the optical signal transmitted from the first optical signal converting/transmitting device 101 and converting it to the electric signal by the optical signal receiving/converting device 203.

A combination of a light emitting diode (LED) and a phototransistor or the like can be used for transmitting and receiving the optical signals.

When these first optical signal transmitting/receiving device 101 and the second optical signal transmitting/receiving device 201 are actually in action, the first signal switching device 109 is controlled to connect the first electric signal processor 110 to the first optical signal transmitting/receiving device 101. Simultaneously, the second signal switching device 209 is controlled to connect the second electric signal processor 210 to the second optical signal transmitting/receiving device 201.

In this manner as described above, form of transmitting information signals by the optical signals is referred to as an optical signal communication form.

The first signal switching device 109 and the second signal switching device 209 are controlled according to a signal-switching control signal 161 outputted from a communication path switching controller 113. The signal-switching control signal 161 is a signal to which the information indicating the signal transmission amount between the main body operation unit 100 and the screen display unit 200 is added.

As described above, when both the first optical signal transmitting/receiving device 101 and the second optical signal transmitting/receiving device 201 function simultaneously, communication by the optical signals is established. In the optical signal communication form which transmits the information signal by the optical signals, there is no change in the electric current and voltage of the LED and the phototransistor which constitute a photoelectrical conversion part under a non-modulated state with no signal. Thus, power consumption is small. However, when the optical signal communication is performed by using the first optical signal transmitting/receiving device 101 and the second optical signal transmitting/receiving device 201 at all times, a larger amount of power is consumed compared to that of the regular electric signal communication. This is caused by power loss generated when converting the electric signals into the optical signals and power loss and the like generated when converting the optical signals into the electric signals. Particularly, for a portable information terminal apparatus which operates by the power supply from the power supply device (charger) 151, the amount of power consumption is an extremely important factor and desired is an apparatus which can save power consumption as much as possible. However, in the case where it is necessary to transfer image data with an extremely vast amount of information between the main body operation unit 100 and the screen display unit 200 at a high speed, etc., the optical signal communication with large communication capacity may have to be used since there is a limit in the transfer capacity by the electric signals.

Thus, in the portable information terminal apparatus, the communication path switching controller 113 calculates the signal transmission amount between the main body operation unit 100 and the screen display unit 200 based on signal transmission path selection information 114 inputted from a key inputting device 121. The signal transmission path selection information 114 herein, for example, is command information of communication/image pickup, which is inputted to the key inputting device 121 by a user of the portable information terminal apparatus.

It is judged whether the calculated amount of the signal transmission is below the upper limit value which is set in advance so that it can be sufficiently dealt by the electric signal communication, or it is equal to or more than the upper limit value so that it is necessary to use optical signal communication for achieving highly accurate information transmission. It is judged by the signal path switching controller 113.

As described above, the upper limit value means the upper limit value of the information amount which can be transmitted between the main body operation unit 100 and the screen display unit 200 by the electric signal communication without any difficulties. It is calculated in advance and stored in the communication path switching controller 113.

The communication path switching controller 113 actuates the first optical signal transmitting/receiving device 101 and the second optical signal transmitting/receiving device 201 only when judging that it is necessary to perform optical signal communication. If not, the communication path switching controller 113 actuates the first electric signal transmitting/receiving device 106 and the second electric signal transmitting/receiving device 206. Hereinafter, the detail will be described.

The signal transmission path is a communication path for exchanging the information between the physically separated main body operation unit 100 and screen display unit 200 in the portable information terminal apparatus of the embodiment. There are two communication paths, one of which is optical signal communication path and the other is the electric signal communication path. The optical signal communication path is constituted by the first electric signal transmitting/receiving device 106 and the second electric signal transmitting/receiving device 206. The signal transmission path selection information 114 is the data to which the signal communication path switching controller 113 (for example, a microcomputer) refers for determining which of the routes to be selected out of the optical signal communication path and the electric signal communication path. The signal transmission path selection information 114 is basically the data which indicates the signal transmission amount between the main body operation unit 100 and the screen display unit 200. The communication path switching controller 113 switches the communication form according to the contents of the signal transmission path selection information 114.

In the case of the optical signal communication form using the optical signal communication path, the signal transmission path selection information 114 indicates the following contents.

(1-1): Under the State for Picking Up Image

This is the case where image information obtained from the image pickup device 213 (for example, a built-in micro camera) is displayed in the image display device 211 (for example, a color liquid crystal monitor) in real time. The image information is once transmitted to the first electric signal processor 110 and the first information storage device 111 of the main body operation unit 100 through the optical signal communication path to perform real-time data processing. Then, it is again transmitted through the optical signal communication path to the image display device 211 through the second electric signal processor 210 to be displayed as a video. A series of this image processing handles an extremely vast amount of data at a high speed and continuously. Thus, the signal transmission amount in this case becomes the value which is equal to or more than the upper limit value. Upon detecting it from the signal transmission path selection information 114, the communication path switching controller 113 sets the communication state to the optical signal communication.

(1-2): Under the State where Stored Moving Picture is Displayed in the Image Display Device 211

The moving picture information stored in the first information storage device 111 in the main body operation unit 100 is transmitted to the image display device 211 in the screen display unit 200 in real time. Thus, the signal transmission amount in this case becomes the value which is equal to or more than the upper limit value. Upon detecting it from the signal transmission path selection information 114, the communication path switching controller 113 sets the communication form to the optical signal communication.

(1-3): Under the State where Moving Picture Information is Downloaded on the Internet The image display unit 200 comprises the image information retrieving device 212 which downloads images on the Internet through the antenna 124. There may be a case where the moving picture information obtained by the image information retrieving device 212 is transmitted to the first electric signal processor 110 of the main body operation unit 100. In that case, the signal communication amount becomes the value which is equal to or more than the upper limit value. Upon detecting it from the signal transmission path selection information 114, the communication path switching controller 113 sets the communication form to the optical signal communication.

(1-4): Under the State where the Image Information is Transmitted Between the Main Body Operation Unit 100 and the Screen Display Unit 200

For example, when the vast amount of the image information stored in the first information storage device 111 is transferred to the second information storage device 214, the signal communication amount exceeds the upper limit value. Upon detecting it from the signal transmission path selection information 114, the communication path switching controller 113 sets the communication form to the optical signal communication.

As described above, when the vast amount of the image information is transferred between the physically separated main body operation unit 100 and the image display unit 200, the signal transmission amount between the main body operation unit 100 and the screen display unit 200 becomes large thereby exceeding the upper limit value. Upon detecting it from the signal transmission path selection information 114, the communication path switching controller 113 sets the communication form to the optical signal communication. Particularly, when it is necessary to display the image in real time, the signal transmission amount becomes large and high transmission accuracy is required. In that case, the optical signal communication becomes essential.

Inversely, when the signal transmission path selection information 114 indicates that it is not in the above-described states (1-1)-(1-4), the signal transmission amount is below the above-mentioned upper limit value. Upon detecting it, the signal path switching controller 113 sets the electric signal communication as the communication form and gives a command to the first and second signal switching devices 109, 209 to perform switching. With this, the communication form is set to be the electric signal communication and consumption of power can be saved as a result.

Figure 2:
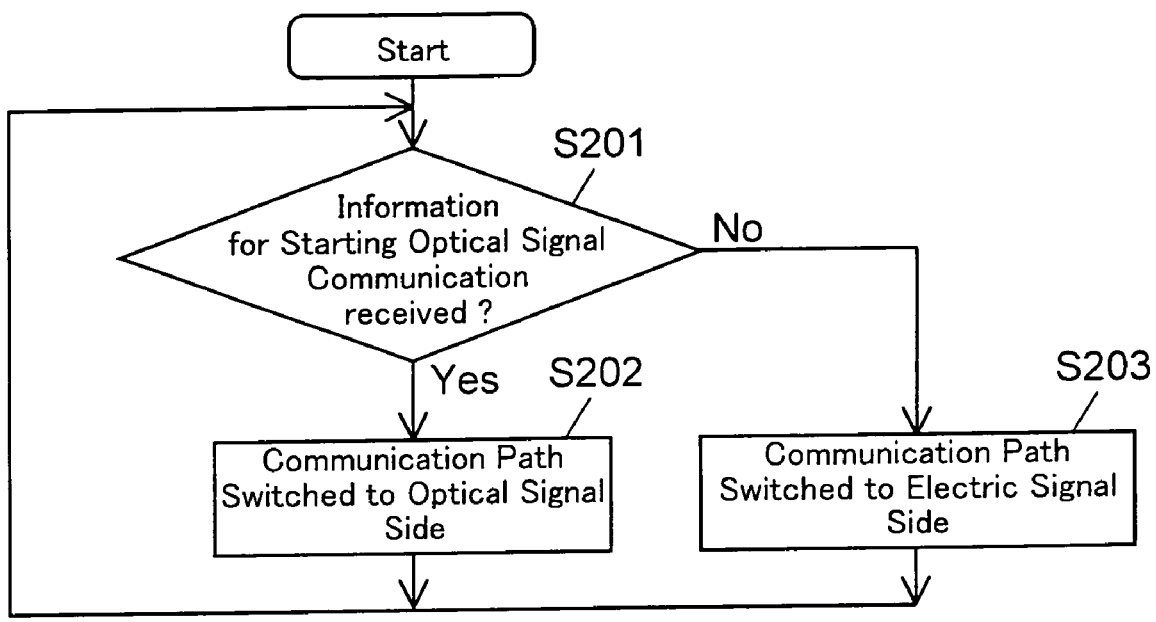
FIG. 2 is a flowchart showing selection of a communication path performed by a communication path switching controller 113 of the portable information terminal apparatus according to the first embodiment.

FIG. 2 is a flowchart for illustrating the processing performed by the communication path switching controller 113 in the main body operation unit 100 of the portable information terminal apparatus of the embodiment at the time of selecting the communication path.

In FIG. 2, the communication path switching controller 113 constantly monitors the inputted signal transmission path selection information 114 and, first, judges in a step S201 whether or not the information requiring the optical signal communication is inputted. When the signal transmission path selection information 114 is the information indicating the four cases of (1-1)-(1-4) described above, it proceeds to step S202 in which the communication path switching controller 113 transmits the signal-switching control signal 161 to the first signal switching device 109 and the second signal switching device 209 for switching the communication path to the optical signal side.

Meanwhile, when the signal transmission path selection information 114 is not the information indicating the above-described four cases of (1-1)-(1-4), it proceeds to a step S203 in which the communication path switching controller 113 transmits the signal-switching control signal 161 to the first signal switching device 109 and the second signal switching device 209 for switching the communication path to the electric signal side.

The signal transmission path selection information 114 of (1-1)-(1-4) as described above is merely an example and if there are other conditions which require high-speed communication of vast-amount information, the optical signal communication path may be selected in the same manner.

Figure 3:
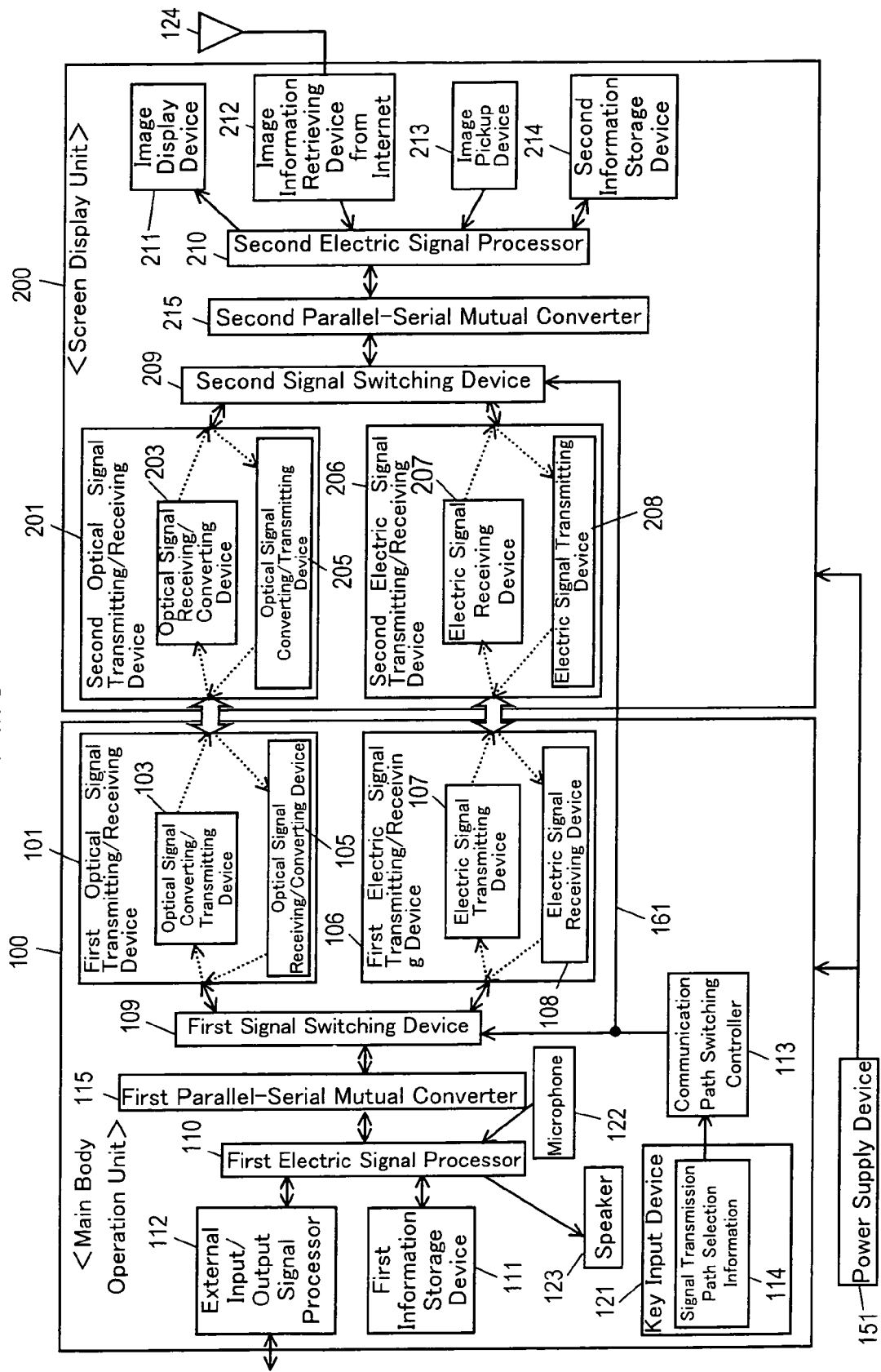
FIG. 3 is another block diagram of the portable information terminal apparatus according to the first embodiment.

FIG. 3 is another block diagram of the portable information terminal apparatus according to the first embodiment of the present invention. The difference from the one shown in FIG. 1 is that a first parallel-serial mutual converter 115 is provided between the first electric signal processor 110 and the first signal switching device 109, and a second parallel-serial mutual converter 215 is provided between the second electric signal processor 210 and the second signal switching device 209.

With the structure shown in FIG. 3, the electric signal used between the first electric signal transmitting/receiving device 106 and the second electric transmitting/receiving device 206 becomes the serial electric signal of 1-bit unit, which is converted from the parallel electric signal (for example, the electric signal of 4-byte unit). In this case, data transmission speed becomes $\frac{1}{32}$, however, it is possible to transmit the information with sufficient margin by restricting to transmit only the audio information and the like with the amount of $\frac{1}{1000}$ or smaller than that of the image information.

With this structure, it enables to reduce the number of cables for the electric signal communication between the main body operation unit 100 and the screen display unit 200 thereby simplifying the signal transmission structure. In the followings, the signal transmission structure of the present invention will be described by referring to the case where the data of 4-byte unit is converted into the serial data of 1-bit unit for performing high-speed transfer of data. Also, the structure of the portable information terminal apparatus to which this signal transmission structure is mounted will be described by referring to FIG. 4A and FIG. 4B.

In this case, if the data is transmitted at a high speed by the conventional structure which uses only the electric signal transmission wirings, thirty-two electric signal transmission wirings are required for achieving parallel transmission since the transmission speed per wire is limited due to generation of external noise and the like reflected upon the frequency characteristic of the wirings. Thus, as shown in FIG. 4A, in the conventional structure, width of a flexible wiring substrate 300 which encloses the electric signal transmission wirings in parallel becomes wide. As a result, it becomes hard to move the electric signal transmission wirings (the flexible wiring substrate 300) freely within a hinge 301. In such structure of the conventional electric signal transmission wirings and, particularly, in the portable information terminal apparatus comprising a hinge (for example, a cross joint) which can be folded lengthwise and widthwise, the electric signal transmission wirings (the flexible wiring substrate 300) become the factor for restricting the motion of the hinge thereby causing inconvenience.

On the contrary, when the data is transmitted at a high speed by the structure of the present invention, when it exceeds the transmission speed per wire, which is that of the conventional case using only the electric signal transmission path, the transmission form can be switched to the optical signal transmission. Thus, required is a single electric signal transmission wiring 302. Accordingly, there are three wirings even with the optical signal transmission wiring (optical fiber) 303 and the power supply line 304 added to the electric signal transmission wiring 302. Therefore, it is possible to freely move the transmission wirings (electric signal transmission wiring 302+optical signal transmission wiring 303+power supply line 303) within the hinge. Thereby, as shown in FIG. 4B, even in the portable information terminal apparatus comprising the hinge 305 with the structure (for example, cross joint) which can be folded lengthwise and widthwise, the transmission wirings (electric signal transmission wiring 302+optical signal transmission wiring 303+power supply line 303) are not the factors for restricting the motion of the hinge 305. As a result, the hinge 305 can be freely folded lengthwise and widthwise. In FIG. 4A and FIG. 4B, reference numeral 306 is a casing for enclosing the main body operation unit 100, 307 is a casing for enclosing the screen display unit 200. The hinge 305 connects the casing 306 and the casing 307, and the flexible wiring substrate 300 and the transmission wirings (electric signal transmission wiring 302+optical signal transmission wiring 303+power supply line 303) are disposed through inside the hinges 301, 305 and connect the main body operation unit 100 and the screen display unit 200 to be capable of transmitting the signals.

As described above, the present invention enables to suppress the power consumption by limiting the amount of the optical signal communication which consumes a large power to the minimum. Furthermore, it becomes possible to reduce the number of wirings for performing the electric signal communication by decreasing communication load on the electric signal communication through transmitting the data of a vast amount of communication volume by the optical signal communication. Thus, the power consumption in the electric signal communication can be suppressed. Moreover, in the portable information terminal apparatus, it is possible to provide wirings easily in a part (for example, hinge part and the like) where it is hard to provide a large number of wirings. In addition, radiation of electromagnetic wave generated from the cables can be reduced and it becomes easy to suppress electromagnetic interference upon other apparatuses. Therefore, the effect of its practical use is significant.

Second Embodiment

Figure 5:
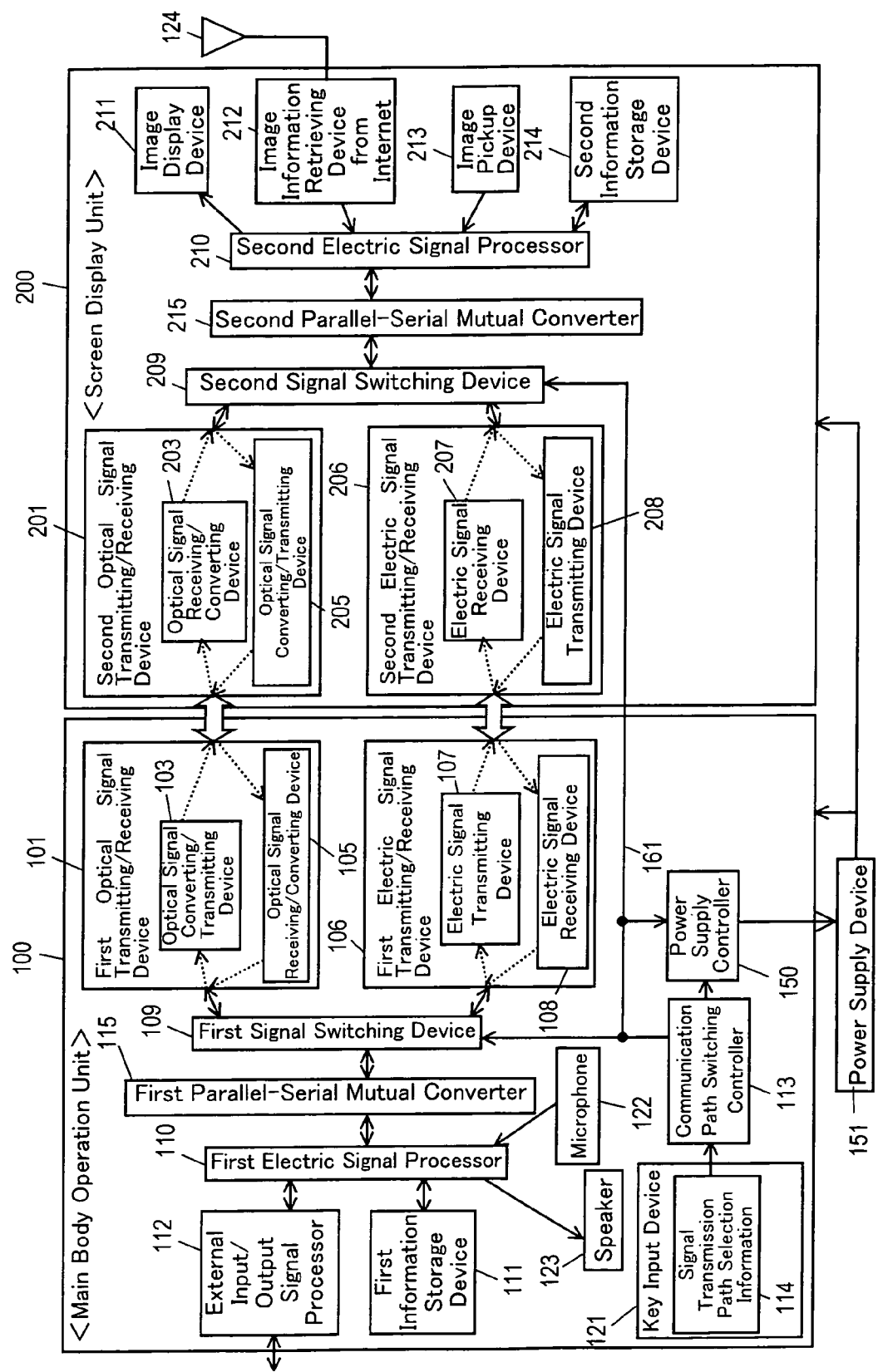
FIG. 5 is a block diagram of a portable information terminal apparatus according to a second embodiment of the present invention.

FIG. 5 is a block diagram of the portable information terminal apparatus according to a second embodiment of the present invention. The structure of the embodiment shown in FIG. 5 is basically the same as that of the modification example of the first embodiment shown in FIG. 3. The same reference numerals are applied to the same structural elements as those of FIG. 3 and the explanation will be omitted.

The difference in the structure of the portable information terminal apparatus (FIG. 5) of the embodiment and the structure of FIG. 3 is that a power supply controller 150 is additionally provided to the main body operation unit 100. The power supply controller 150 controls power supply for the main body operation unit 100 and the screen display unit 200. The embodiment is particularly distinctive in terms of the power supply control for the first and second optical signal transmitting/receiving devices 101, 201 (referred to as "optical signal transmitting/receiving units" hereinafter) and the power supply control for the first and second electric signal transmitting/receiving devices 106, 206 (referred to as "electric signal transmitting/receiving units" hereinafter) performed by the power supply controller 150. The details of the power supply control of the embodiment will be described hereinafter.

(2-1): In the Case where Optical Signal Transmitting/Receiving Unit Functions Until Optical Signal Communication Ends It is a waste of electric power to continuously supply the power while not in use whether it is the optical signal transmitting/receiving unit or the electric signal transmitting/receiving unit. In the portable information terminal, one is to be selected out of the optical signal transmitting/receiving unit and the electric signal transmitting/receiving unit. That is, when the optical signal transmitting/receiving unit is selected to be in use, the electric signal transmitting/receiving unit is not used and is in a standby state. Likewise, when the electric signal transmitting/receiving unit is selected to be in use, the optical signal transmitting/receiving unit is not used and is in a standby state. Therefore, power supply for the one under the standby state is stopped since it is unnecessary.

FIG. 6A illustrates an example of switching state of the communication device between the main body operation unit 100 and the screen display unit 200 of the portable information terminal apparatus of the embodiment. FIG. 6B and FIG. 6C respectively illustrate the power supply state of the optical signal transmitting/receiving unit and the electric signal transmitting/receiving unit under that communication switching state.

In FIG. 6A, period AB represents the optical signal communication state and other periods represents the electric signal communication state. The optical signal transmitting/receiving unit functions in the period AB, so that power supply for the optical signal transmitting/receiving unit is performed (ON state) only in the period AB as can be seen from FIG. 6B. It is unnecessary for the optical signal transmitting/receiving unit to function in other periods so that power supply for the optical signal transmitting/receiving unit is stopped (OFF state). A communication device switching signal shown in FIG. 6A is the same as the signal-switching control signal 161 outputted from the communication path switching controller 113, and the signal-switching control signal 161 is inputted to the power supply controller 150. Upon receiving the signal-switching control signal 161, the power supply controller 150 judges whether or not it is necessary to supply the power to the optical signal transmitting/receiving unit.

Figure 7A:
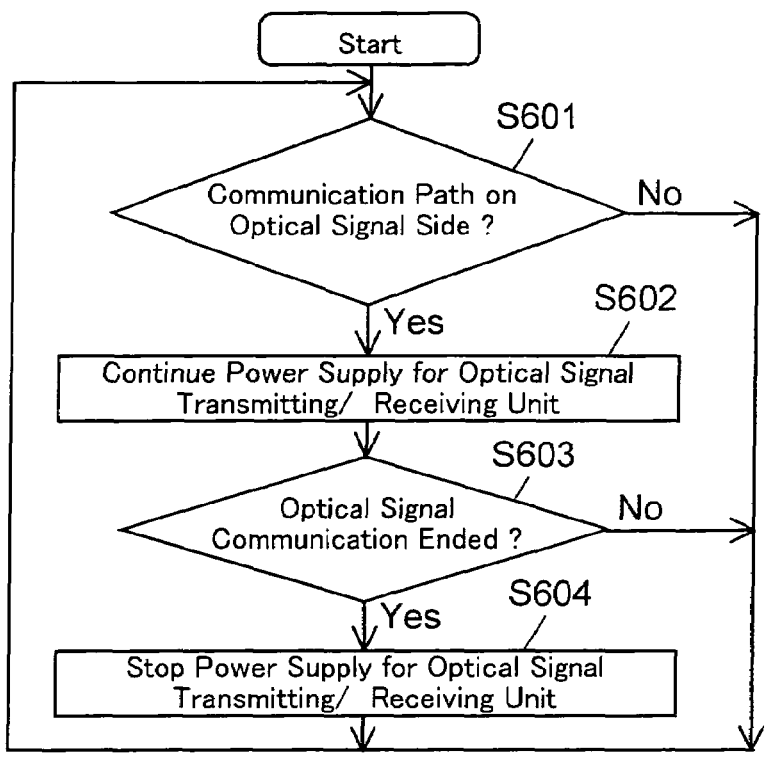
FIGS. 7A and 7B are flowcharts for illustrating control of power supply performed by a power supply controller 150 of the portable information terminal apparatus according to the second embodiment.

FIG. 7A is a flowchart showing algorithm for judging ON/OFF of power supply for the optical signal transmitting/receiving unit performed by the power supply controller 150. In the followings, the detail of the flowchart will be described by referring to FIG. 5, FIG. 6A, and FIG. 6B. The following processing is performed by the power supply controller 150 and the power supply device 151.

In a step S601, it is judged whether or not the communication path is on the optical signal side (whether or not the communication form is set to be the optical signal communication). In FIG. 6A, the electric signal communication path (electric signal communication) is set at the period until reaching time A so that processing is ended without any action in that period based on the judgment of step S601.

In FIG. 6A, let's assume that it has reached the time A and the communication path is switched from the electric signal communication to the optical signal communication, i.e. the communication form is switched form the electric signal communication to the optical signal communication. Upon detecting in the step S601 that there is a change in the form, the power supply controller 150 proceeds to a step S602 in which the power supply for the electric signal transmitting/receiving unit performed by the power supply device 151 is stopped and then the power supply for the optical signal transmitting/receiving unit is started.

Then, as shown in FIG. 6B, let's assume that it has reached the time B and the communication path is switched from the electric signal communication side to the optical signal communication side. In this case, the period AB represents the period for supplying the power to the optical signal transmitting/receiving unit. Thus, the power is supplied from the power supply device 151 to the optical signal transmitting/receiving unit only during the period AB so that the optical signal communication functions. When it reaches the time B, the power supply controller 150 stops the power supply for the optical signal transmitting/receiving unit performed by the power supply device 151 and then starts the power supply for the electric signal transmitting/receiving unit.

Since the optical signal communication form continues until reaching the time B shown in FIG. 6, it returns to the processing of the step S601 without performing processing of a step S604 after the step S603 which judges the end of the optical signal communication.

After the time B, as shown in FIG. 6A, the communication form is switched from the optical signal communication to the electric signal communication and the communication path is switched from the optical signal communication path to the electric signal communication path. This change in the communication form means that the communication by the optical signals has ended. Thus, it is judged in the step S603 to be the end of the optical signal communication thereby proceeding to the step S604. The roll of the optical signal transmitting/receiving unit ends here, and the power supply controller 150 stops the power supply for the optical signal transmitting/receiving unit performed by the power supply device 151 and starts the power supply for the electric signal transmitting/receiving unit. FIG. 7A is a flowchart for illustrating algorithm for judging the power supply for the optical signal transmitting/receiving unit so that the control of the power supply for the electric signal transmitting/receiving unit is not illustrated as a step.

Figure 7B:
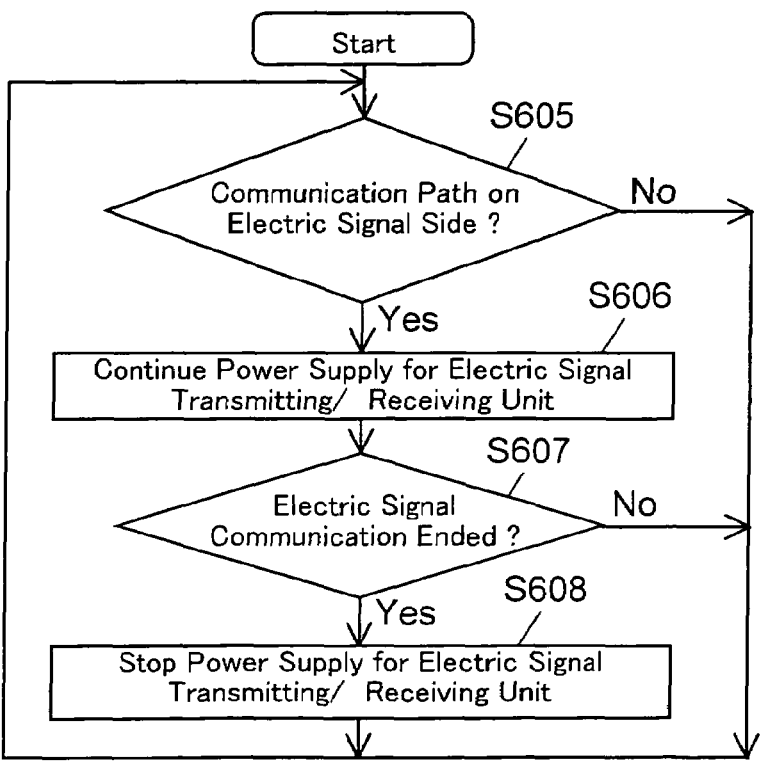

FIG. 7B is a flowchart for illustrating algorithm for judging ON/OFF of power supply for the electric signal transmitting/receiving unit performed by the power supply controller 150.

The detail of the flowchart will be described by referring to FIG. 6A-FIG. 6C. In a step S605, it is judged whether or not the communication path is on the electric signal side (whether or not the communication form is set to be the electric signal communication). In FIG. 6A, it is assumed that the electric signal communication device (the electric signal communication) is set in the period until reaching the time A. Thus, it proceeds from the step S605 to a step S606 in this period and the power supply for the electric signal transmitting/receiving unit is continued. Then, when it is judged in a step S607 that the electric signal communication has not ended, it returns to the processing of the step S605 without performing the processing of a step S608.

In FIG. 6A, when it is assumed that the communication path is switched from the electric signal to the optical signal at the time A, i.e. the communication form is switched from the electric signal communication to the optical signal communication, this change in the form is detected in a step S607. Upon this, it proceeds to the step S608 in which the power supply for the electric signal transmitting/receiving unit is stopped and the power supply for the optical signal transmitting/receiving unit is started. The period AB in FIG. 6C represents the period in which the power supply for the electric signal transmitting/receiving unit is stopped. FIG. 7B is a flowchart for illustrating algorithm for judging the power supply for the electric signal transmitting/receiving unit so that the control of the power supply for the optical signal transmitting/receiving unit is not illustrated as a step. As described above, the power supply for the electric signal transmitting/receiving unit performed by the power supply device 151 of FIG. 5 is stopped only in the period AB so that the structure for performing the electric signal communication does not function.

The electric signal communication is not set until the period AB has passed, that is, until reaching the time B of FIG. 6C, so that it is judged "NO" in the judgment (judging whether or not the communication path is on the electric signal side) in the step S605 and the processing is ended.

It is assumed that the communication path is switched from the optical signal communication path to the electric signal communication path at the time B as shown in FIG. 6A. This change in the form means that the communication form has changed from the optical signal communication to the electric signal communication for starting the electric signal communication. Thus, it is judged in the step S605 to be the start of the optical signal communication thereby proceeding to the step S606. By the processing of the step S606, the power supply for the optical signal transmitting/receiving unit is stopped while the power supply for the electric signal transmitting/receiving unit is started.

Through the power supply control as described above, there is no unnecessary power supplied to the optical signal transmitting/receiving unit and the electric signal transmitting/receiving unit. As a result, it enables to reduce the power consumption of the portable information terminal apparatus as a whole. Thus, the duration of the power supply by the power supply device 151 is extended and the effect thereby is significant.

(2-2): The Case where Function of Optical Signal Transmitting/Receiving Unit is Stopped Whether Optical Signal Communication has Ended or Not Among the optical signal communication forms, there may be ones with uncertain communication end time. Among those optical signal communication forms with the uncertain end time, there are optical signal communication form which essentially requires continuation of the optical signal communication form until the end of the optical signal communication even though the communication end time is uncertain. There is also the optical signal communication form which does not necessarily require the same.

As the former optical signal communication form, for example, there is a communication form in which moving picture information is downloaded on the Internet by the image information retrieving device 212. In the case of this communication form, if the moving picture information to be downloaded is interrupted and uncompleted, the remaining image data may not be appropriately obtained. Thus, even though the power is consumed to a certain extent, it is necessary to continue the optical signal communication until downloading is completed.

As the latter optical signal communication form, there is the optical signal communication form which is applied when displaying the object extracted by using the image pickup device 213 on the image display device 211 in real time. If the object is continuously displayed without any specific purpose when displaying it in the image display device 211, power is wasted and it may fall into the state where the portable information terminal apparatus cannot be used due to battery shortage when it is truly needed. This optical signal communication form will be more specifically described.

When an object is picked up by the image pickup device 213 and processed to be recorded, a user of the portable terminal information apparatus waits for a good shooting opportunity while looking for the part or the area of the object to be taken and also displaying the object extracted by the image pickup device 213 on the image display device 211 in real time. Once the part or area of the object to be taken and its shooting timing is determined, actual image pickup is started. When an image pickup form is set, the processing for displaying the image of the object extracted by the image pickup device 213 on the image display device 211 is continuously performed. Therefore, when the signal communication within the apparatus is achieved by the optical signal communication under the state where it is set in the image pickup form, consumption of the battery becomes extremely large.

However, there may be a case where the user sets the image pickup form for picking up an object but on the way the user forgets about it and leaves the portable information terminal apparatus kept in the image pickup form. In that state, the image display is unnecessarily continued and the power is consumed, which can be hardly defined as the efficient battery consumption. Continuous display of the object with no specific purpose as mentioned above falls in such state.

In the embodiment, the case of performing the above-described former optical signal communication form (image pickup form and the like) is defined as the optical signal transmission/reception which does not satisfy a specific condition, while defining the case of performing the above-described latter optical signal communication form as the optical signal transmission/reception which satisfies the specific condition.

For example, the specific condition is that there is no fatal inconvenience caused by switching the communication path from the optical signal communication path to the electric signal communication path after a specific time has passed even when the occupied time of the optical signal transmission path is uncertain as described above. For setting the specific time, it may be determined as appropriate in accordance with the battery capacity (capacity of the power supply device 151) of the portable information terminal apparatus.

In the case of the optical signal transmission/reception which satisfies the specific condition, the power supply controller 150 and the power supply device 151 perform control for switching the communication path from the optical signal side to the electric signal side after forcibly stopping the power supply for the optical signal transmitting/receiving unit at the point where the specific time has passed from the start of using the optical signal transmitting/receiving unit.

Figure 8:
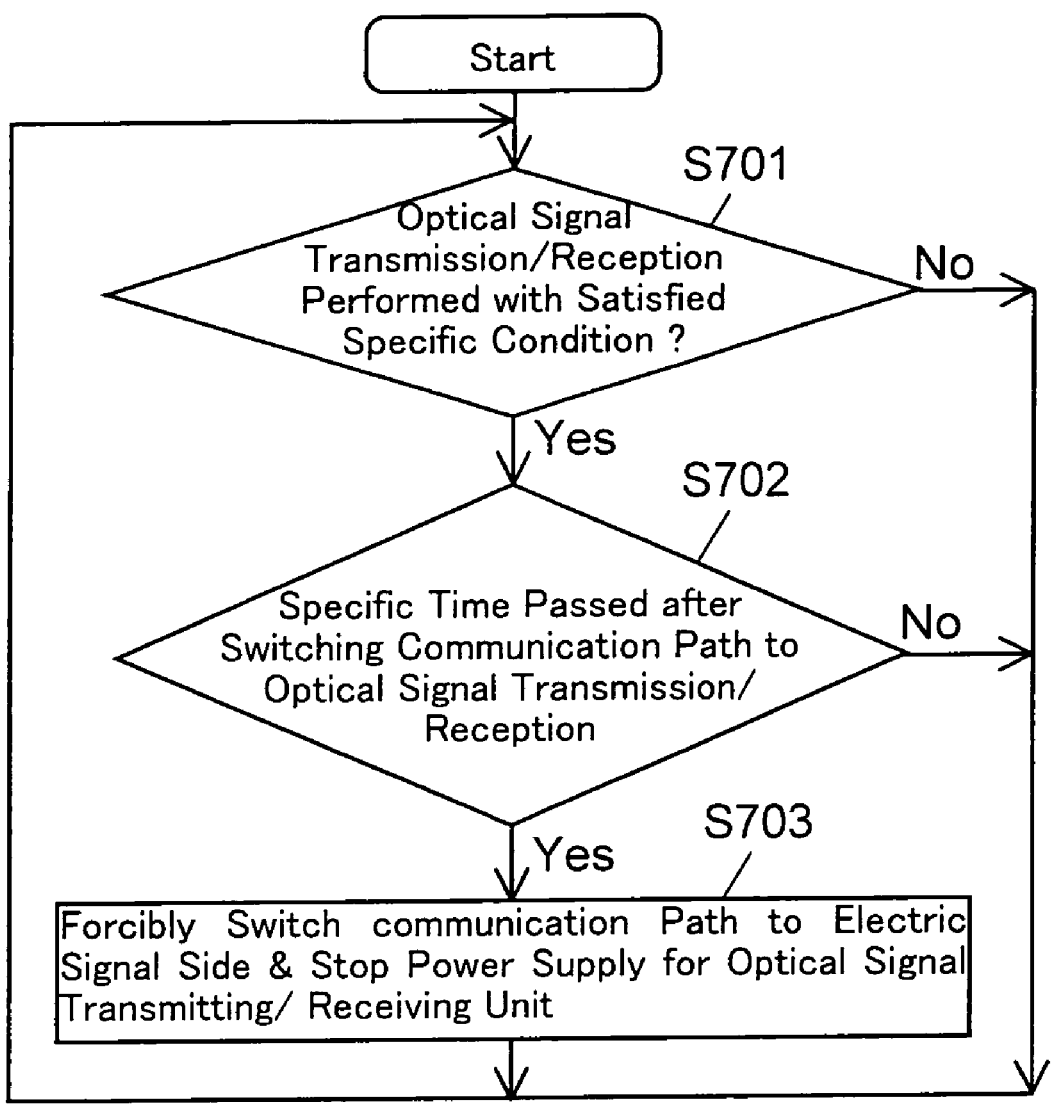
FIG. 8 is another flowchart for illustrating control of power supply performed by the power supply controller 150 of the portable information terminal apparatus according to the second embodiment.
Figure 9A:
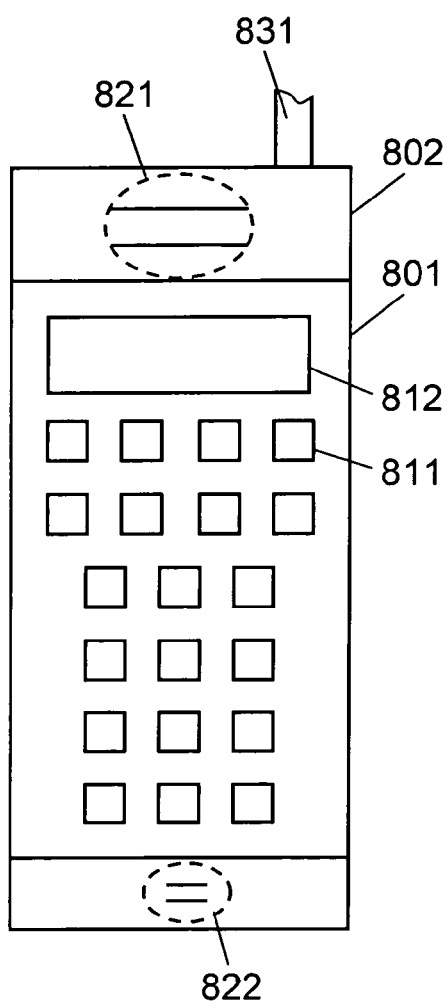
FIGS. 9A and 9B are illustration for showing the structure of the conventional portable telephone.
Figure 9B:
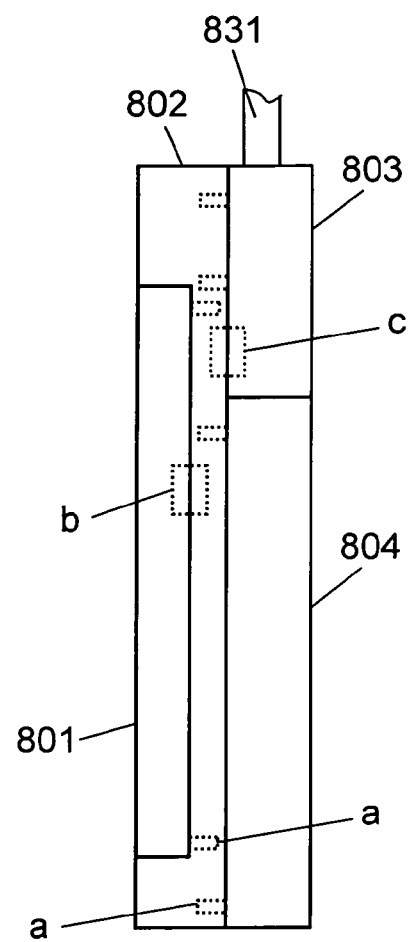
Figure 10:
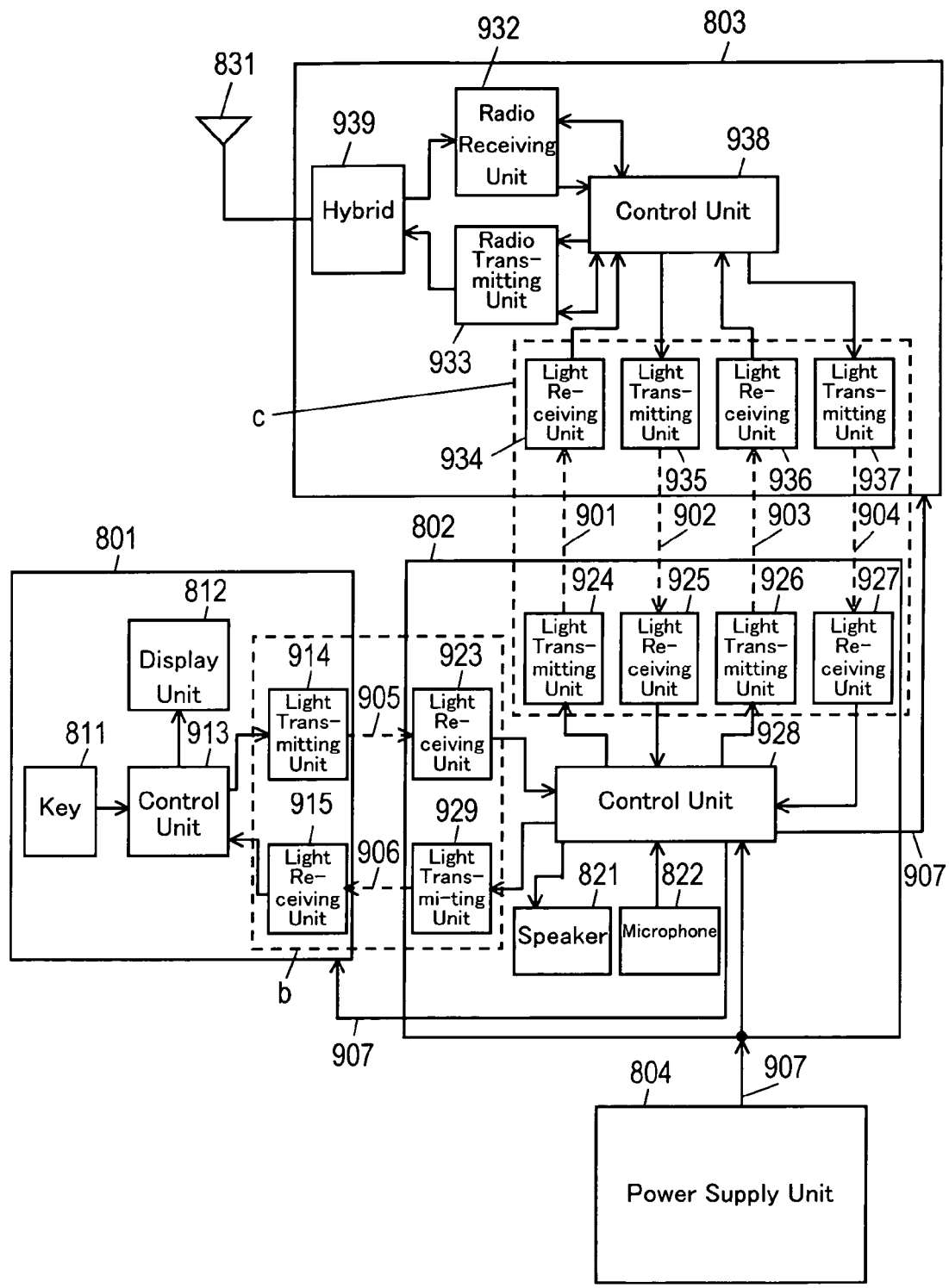
FIG. 10 is a block diagram of the conventional portable telephone.

FIG. 8 is a flowchart for illustrating the power supply control performed by the power supply controller 150 and the power supply device 151 in the embodiment. The details of the flowchart will be described hereinafter by referring to FIG. 5 and FIGS. 6A-6C.

In a step S701, first, it is judged whether or not the optical signal transmission/reception satisfying the specific condition is performed. The judgment in S701 is performed based on the signal transmission path selection information 114 described above. When it is judged in S701 that the above-described specific condition is not satisfied, it leaves from the routine and returns to the start without performing any processing.

When it is judged in S701 that the above-described specific condition is satisfied, it proceeds to a step S702 in which the communication form is switched to the optical signal communication (that is, switched to the optical signal communication path) and then it is judged whether or not the specific time has passed. In FIG. 5, the time A is the point where the optical signal communication satisfying the specific condition is started, so that the past time from the time A is measured. The measurement may be performed by the communication path switching controller 113 or the power supply controller 150, for example. Further, the communication path switching controller 113 or the power supply controller 150 judges whether or not the past time to be measured exceeds the specific time which is set in advance (S702). Upon judging that the past time being measured has exceeded the preset specific time, the power supply controller 150 stops the power supply for the optical signal transmitting/receiving unit and also restart power supply for the electric signal transmitting/receiving unit. Furthermore, the communication path switching controller 113 or the power supply controller 150 notifies the first signal switching device 109 and the second signal switching device 209 that the target of power supply is switched from the optical signal transmitting/receiving unit to the electric signal transmitting/receiving unit. Upon recognizing that power supply is switched to the electric signal transmitting/receiving unit, the first signal switching device 109 and the second signal switching device 209 switch the communication path from the optical signal communication path to the electric signal communication path (S703).

By the operation of the step S703, the optical signal communication function is forcibly stopped. In FIG. 5, this means that the power supply controller 150 has received the signal-switching control signal 161 from the communication path switching controller 113 and the power supply from the power supply device 151 to the optical signal transmitting/receiving unit is shuttered.

In this case, the image screen which is picked up by the image pickup device 213 and displayed on the image display device 211 suddenly disappears. However, if display is required, redisplay may be conducted. With this, it is possible to prevent unnecessary continuous long-time display which excessively consumes the battery of the portable information terminal apparatus. Also, since the optical signal communication path can be switched to the electric signal communication path, it is possible to inform the user by sending letter display or the like for describing the circumstance by displaying it on the image display device 211 through the electric signal communication path after the displayed image has disappeared.

As described above, by forcibly stopping the power supply for the optical signal transmitting/receiving unit under the specific condition, power consumption of the portable information terminal apparatus can be more saved.

The portable information terminal apparatus according to the present invention can save the power by selectively using the optical signal communication device and the electric signal communication device in accordance with the extent of the capacity of the communication in use and the form to be used. Thus, it is effective for the field of portable telephones.

Although the present invention has been described in detail by referring to the preferred embodiments, it is intended to embrace all such alternatives, modifications, and variations in combinations and arrangements of the components of the preferred embodiments within the spirit and broad scope of the appended claims.

What is claimed is:

1. A portable information terminal apparatus, comprising first and second circuit blocks capable of transmitting a signal between each other, and a switching device, wherein:

said first circuit block comprising:

a first optical signal transmitting/receiving device which converts an electric signal into an optical signal for transmitting it to said second circuit block and also converts an optical signal received from said second circuit block into an electric signal, and a first electric signal transmitting/receiving device which transmits an electric signal to said second circuit block and also receives an electric signal from said second circuit block;

said second circuit block comprising:

a second optical signal transmitting/receiving device which converts an electric signal into an optical signal for transmitting it to said first circuit block and also converts an optical signal received from said first circuit block into an electric signal, and a second electric signal transmitting/receiving device which transmits an electric signal to said first circuit block and also receives an electric signal from said first circuit block; and said switching device switches optical signal communication form achieved by said first and second optical signal transmitting/receiving devices and electric signal communication form achieved by said first and second electric signal transmitting/receiving devices according to a signal transmission amount between said first and second circuit blocks.

2. The portable information terminal apparatus according to claim 1, wherein said switching device selects said optical signal communication form when said signal transmission amount is equal to or more than an upper limit which is set in advance, and selects said electric signal communication form when said signal transmission amount is below said upper limit.

3. The portable information terminal apparatus according to claim 1, wherein said electric signal is a signal which is converted from a parallel signal into a serial signal.

4. The portable information terminal apparatus according to claim 1, wherein:
said first circuit block comprises a first parallel-serial mutual signal converter which converts a parallel electric signal into a serial electric signal for transmission and also converts a received serial electric signal into a parallel electric signal;
said first electric signal transmitting/receiving device transmits/receives said serial electric signal;
said second circuit block comprises a second parallel-serial mutual signal converter which converts a parallel electric signal into a serial electric signal for transmission and also converts a received serial electric signal into a parallel electric signal; and
said second electric signal transmitting/receiving device transmits/receives said serial electric signal.

5. The portable information terminal apparatus according to claim 1, further comprising:
a power supply controller which shuts power supply for said first and second electric signal transmitting/receiving devices in a state where said switching device selects said optical signal communication form, while shutting power supply for said first and second optical signal receiving/transmitting devices in a state where said switching device selects said electric signal communication form.

6. The portable information terminal apparatus according to claim 1, further comprising:
a power supply controller which stops a power supply for said first and second optical signal transmitting/receiving devices when, under a state where said optical signal communication form is previously selected, wherein a prescribed amount of time has passed from when said switching device previously selected said optical signal communication form.

7. The portable information terminal apparatus according to claim 6, wherein
said switching device switches communication form from optical signal communication to electric signal communication when said prescribed amount of time has passed from when said optical signal communication form was previously selected, and
said power supply controller supplies power to said first and second electric signal transmitting/receiving devices when said prescribed amount of time has passed from when said switching device previously selected said optical signal communication form.

8. The portable information terminal apparatus according to claim 1, comprising a casing for enclosing said first circuit block, a casing for enclosing said second circuit block, and a hinge for connecting said both casings to be foldable, wherein
wirings for communicably connecting said first circuit block and said second circuit block are guided into said both casings through said hinge.

9. The portable information terminal apparatus according to claim 8, wherein said wirings include electric signal transmission wiring and optical signal transmission wiring.

10. The portable information terminal apparatus according to claim 1, comprising a power supply device for supplying power to said first circuit block and said second circuit block, wherein said power supply device is enclosed in said portable information terminal apparatus.

* * * * *